INVENTOR.
Jack J. Ellis
BY
Cromwell, Greist+Warden
Attys.

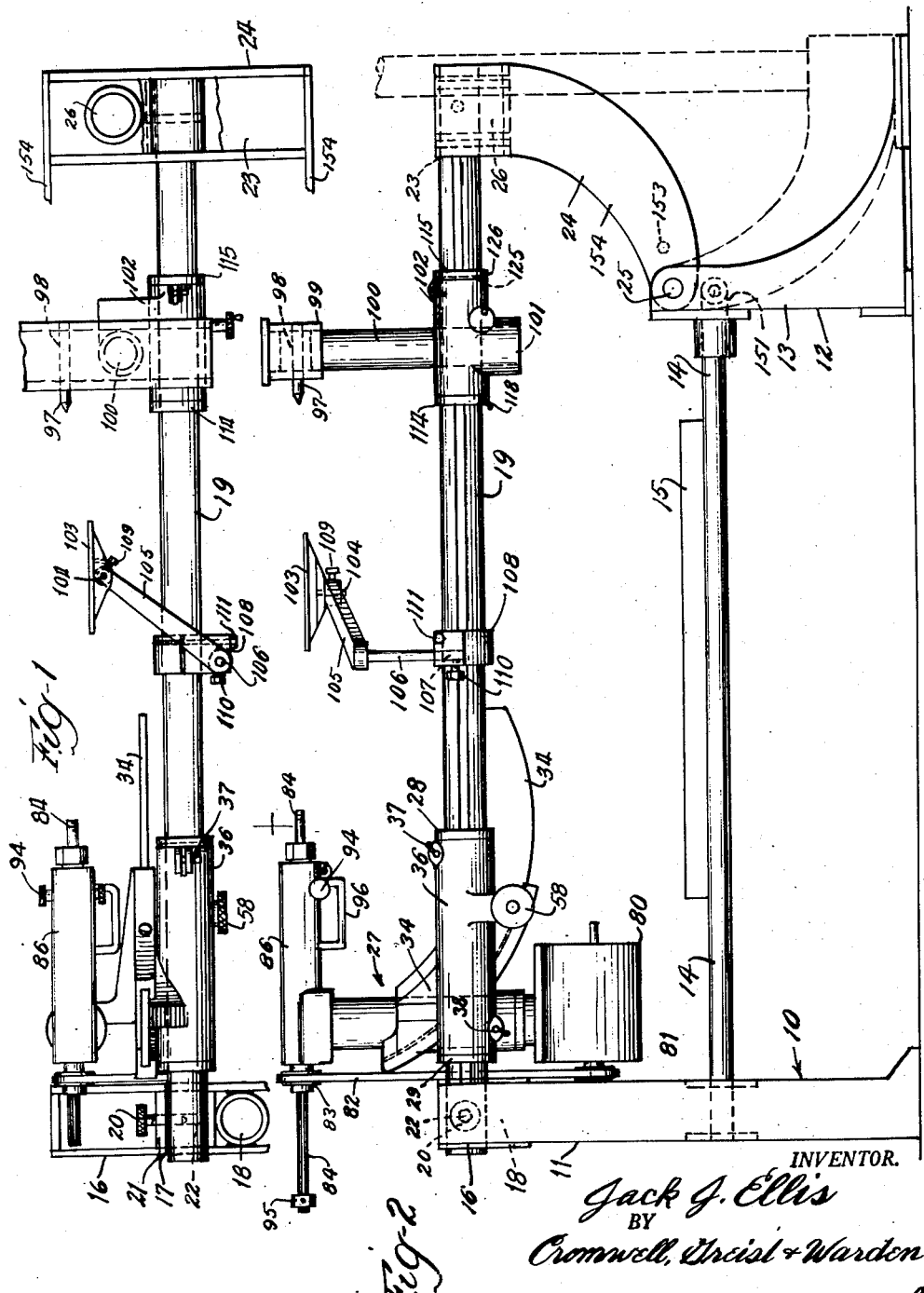

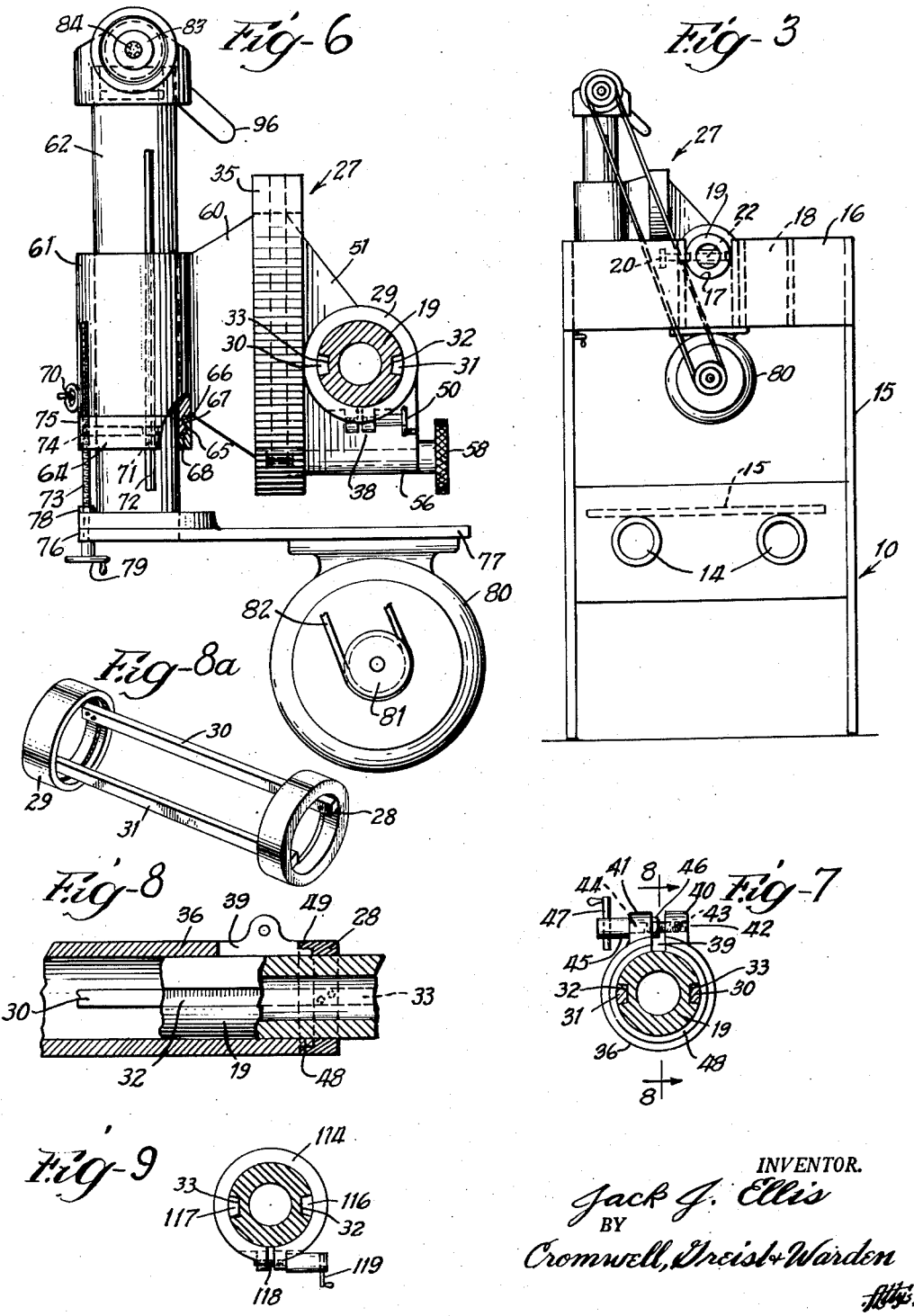

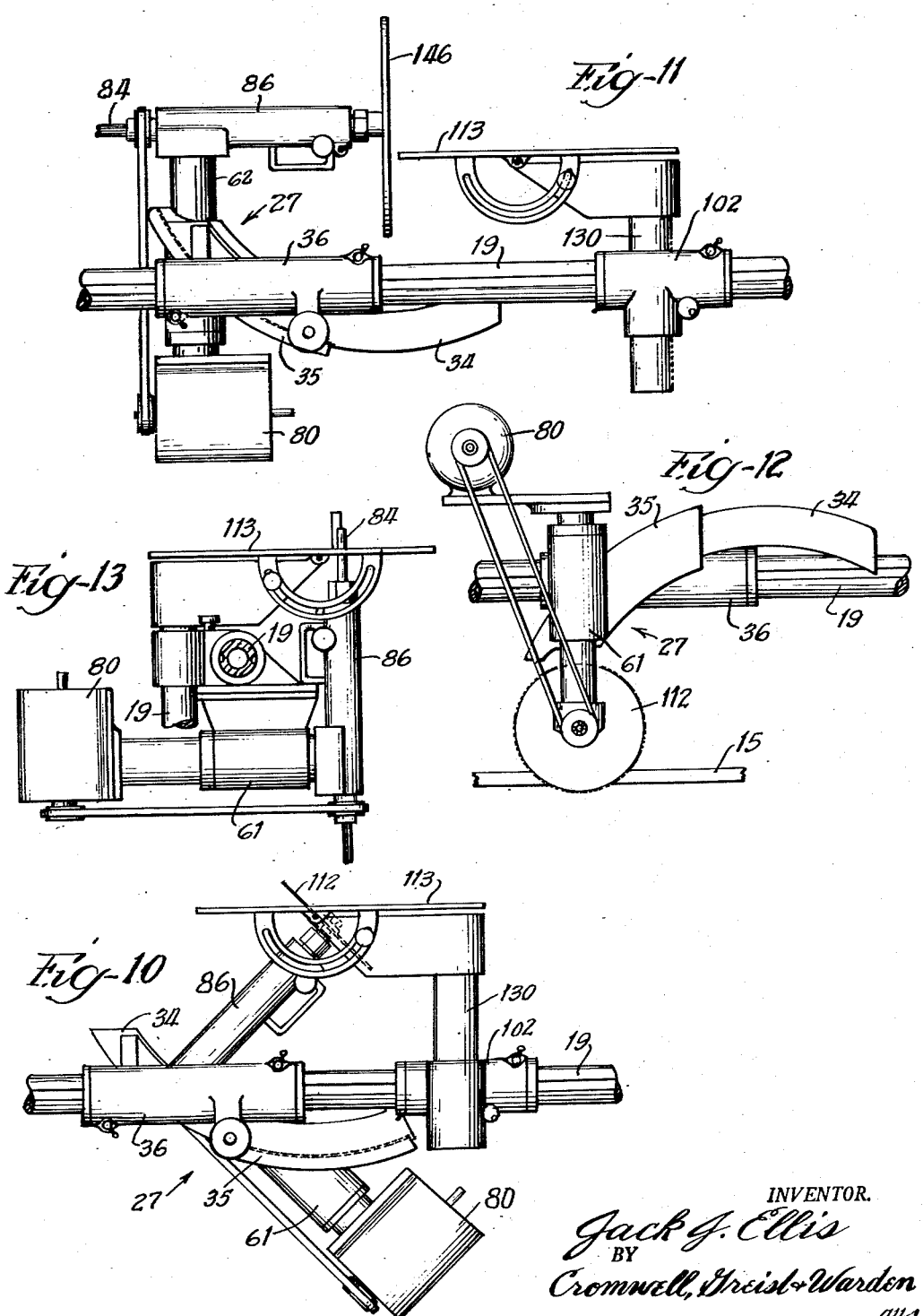

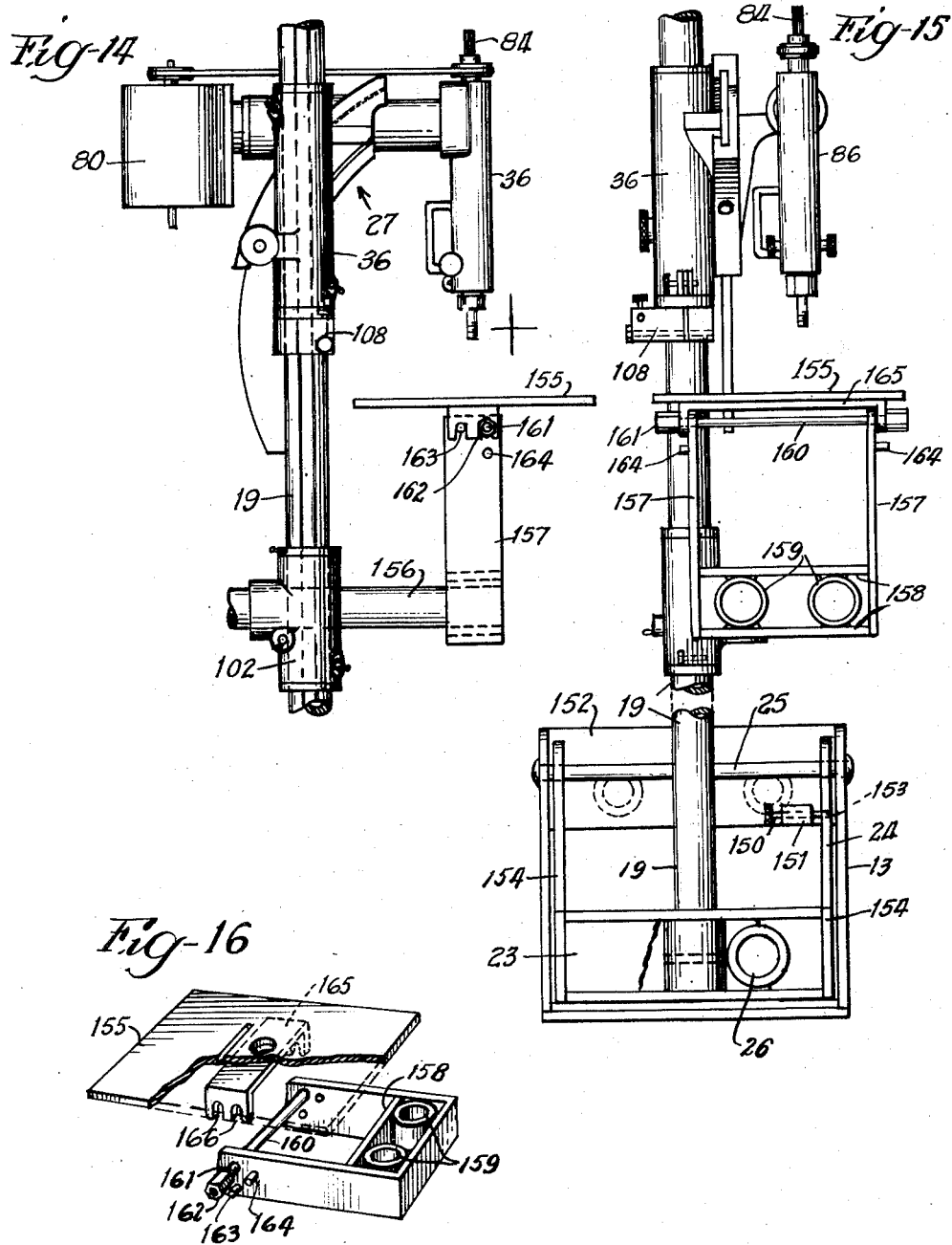

United States Patent Office 2,800,154
Patented July 23, 1957

---

2,800,154

CONVERTIBLE MATERIAL WORKING MACHINE HAVING A TILTABLE BED AND SLIDABLY AND ROTATABLY ADJUSTABLE HEADSTOCK AND TAILSTOCK

Jack J. Ellis, Wilmette, Ill.

Application January 6, 1955, Serial No. 480,097

10 Claims. (Cl. 144—1)

This invention relates to material working machines and is more particularly concerned with improvements in a machine of the type which can be easily adjusted or converted to adapt it to turning, sawing, sanding, grinding, shaping and routing.

It is a general object of the invention to provide a wood or metal working machine of the convertible type which is compact, readily portable, simple in design, efficient in operation, and readily converted or adjusted to adapt it to perform a large number of different operations.

It is a more specific object of the invention to provide a material working machine of the convertible type which comprises a frame including a tubular way which carries in horizontally and axially adjustable relation thereon a carriage having a head stock on which the operating spindle is mounted and which includes a trunnion permitting the spindle to be adjusted at various angles relative to the axis of the supporting way.

It is another object of the invention to provide a combination tool of the type described in which the spindle for rotating the various cutting elements is mounted on the way by a supporting structure or head stock so that the axis of the spindle may be adjusted to vary the distance between the same and the axis of the way and also to vary the angular position of the axis of the spindle relative to the axis of the way.

It is a further object of the invention to provide a convertible tool in which a tool carrying head stock is movably mounted on a single supporting bar by a carriage having end collar members which are slidable relative to the supporting bar and a sleeve which is slidable and rotatable relative to the bar together with clamping elements associated with the sleeve and the collar members which are operable to clamp the sleeve to the bar or to the collar members.

It is a further object of the invention to provide in a convertible tool, a tubular supporting way, a tool carrying head stock, and a carriage which is adapted to movably support the head stock on the way, wherein the carriage comprises a sleeve-like member which is attached to the head stock and a pair of spaced end collars which are mounted on the way, the collars being connected by a key which engages in an axial slot in the way and holds the collars against rotation about the way while permitting movement of the same in the direction of the axis of the way, and the sleeve-like member having clamp means which is operable in one position to clamp the same against rotational or axial movement on the way and in another position to clamp the same to the collars to permit movement of the carriage in the direction of the axis of the way while holding the carriage against rotation about the way.

It is a further object of the invention to provide a convertible tool of the type described in which the operating spindle is mounted on a carriage which is supported on a normally horizontal guide member and a table is provided for cooperation with the spindle to permit the same to be used as a saw, with the spindle being mounted on the carriage by means of a trunnion so that it may be swung to tilt the saw blade relative to the work surface of the table.

It is another object of the invention to provide a convertible tool of the type in which a rotatable tool carrying spindle is mounted for swingable adjustment on a carriage which is movably supported on a way and a work table is provided which is also supported on the way for adjustment relative to the spindle and the way to position the same at various angles relative to the working plane of the tool on the spindle.

It is a still further object of the invention to provide a convertible tool of the type described in which a tool carrying spindle is rotatably mounted in a quill which is adjustably supported in a quill body at one end of a supporting post, with a drive motor mounted at the other end of the supporting post, the supporting post is adjustably mounted in a bore in a trunnion member which has an arcuate slide member movably positioned in an arcuate guideway in a cooperating trunnion member which is connected in fixed relation on a movable carriage, the carriage being slidably and rotatably mounted on a fixed supporting way.

These and other objects and advantages of the invention will be apparent from a consideration of the mechanism which is shown by way of illustration in the accompanying drawings, wherein:

Fig. 1 is a plan view, with portions broken away and with other portions shown schematically, of a combination or convertible tool which incorporates therein the principal features of the invention and which is shown in the position of adjustment which adapts the tool for use as a wood or metal working lathe;

Fig. 2 is a side elevation of the tool shown in Fig. 1;

Fig. 3 is an end elevation of the tool shown in Fig. 1;

Fig. 6 (sheet 2) is a section taken on the line 6—6 of Fig. 5, with portions broken away;

Fig. 7 is a section taken on the line 7—7 of Fig. 5;

Fig. 8 is a section taken on the line 8—8 of Fig. 7;

Fig. 8A is a perspective view of a portion of the carriage for supporting the head stock on the way;

Fig. 9 is a section taken on the line 9—9 of Fig. 5;

Fig. 10 (sheet 4) is a side elevation of the tool as shown in Figs. 4 and 5 with the spindle adjusted to position the saw blade at an angle to the work surface of the work supporting table, the view being partially schematic;

Fig. 11 is a side eelvation, partially schematic, of the tol set up as a sander with a disk sanding element mounted on the spindle;

Fig. 12 is a side elevation, partially schematic, of the tool, set up as a radial saw;

Fig. 13 is a side elevation, partially schematic, of the tool set up as a router or shaper;

Fig. 14 is a partial side elevation of the tool as it appears when adjusted for use as a drill, the view being partially schematic and a modified form of work table being illustrated;

Fig. 15 is an end elevation of the tool when set up as shown in Fig. 14; and

Fig. 16 is a perspective view, with portions broken away, of the modified form of table construction shown in Figs. 14 and 15.

Figure 4:
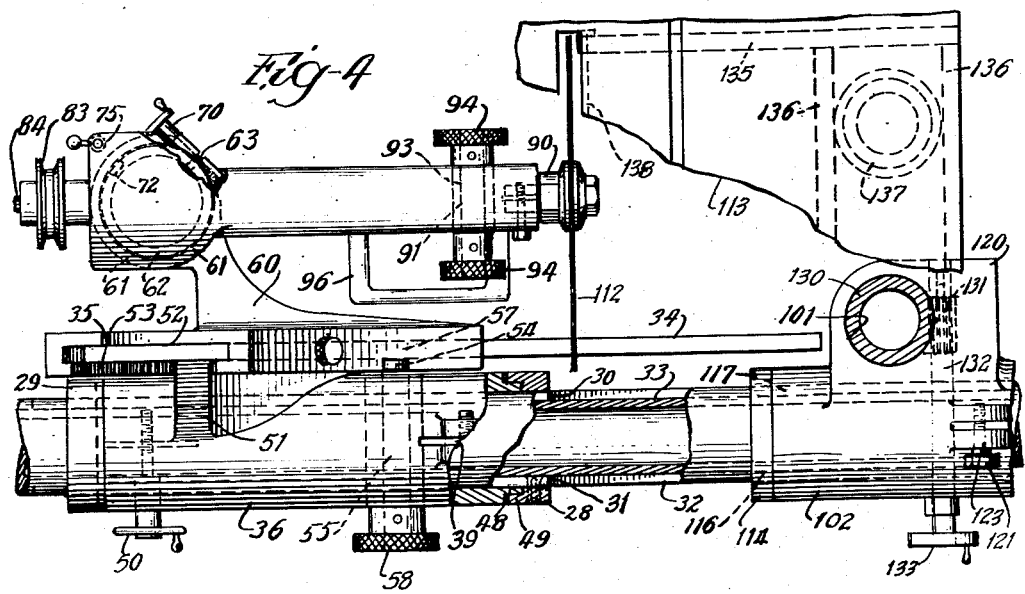
Fig. 4 is a plan view, to an enlarged scale, and with portions broken away, of the head stock and portions of the work table support when the apparatus is set up for use as a table saw.

Referring first to Figs. 1 to 3, there is illustrated a combination or convertible tool which embodies the principal features of the invention and which is arranged with the elements or parts thereof in the position in which the tool forms a wood or metal working lathe. The illustrated device comprises a supporting frame 10 which is employed as a base for supporting the movable elements of the mechanism in all of the positions in which they are adjusted to adapt the tool for various operations.

The supporting frame 10 comprises an upright head end frame section or standard 11 and an upright tail end frame section or standard 12 which are arranged in horizontally spaced relation as shown in Fig. 2 and which may be constructed of metal plates connected by welding or the like to form frame members of adequate strength and rigidity. The lower portion of the head end frame 11 is connected in fixed relation to a lower portion or section 13 of the tail end frame 12 by a pair of laterally spaced horizontal brace rods 14 which extend between the same and have their ends rigidly connected thereto. The brace rods 14 may be provided with a horizontal, transversely extending table or plate member 15 which forms a shelf thereon and which is adapted for use as a work support when the tool is converted to a radial saw.

The head end frame 11 of the supporting structure 10 is generally rectangular in shape with two spaced vertically extending cross plates forming a top frame portion 16 which is provided with an upwardly opening slot or saddle groove 17 and a vertical post receiving bore 18. The saddle groove 17 is adapted to receive the free end of a horizontally disposed tubular way 19. The end of the way 19 may be locked in the saddle groove 17 by means of a locking bolt 20 extending through a web plate 21 into a threaded aperture 22 in the way. The tubular way 19 is rigidly secured at the tail end to the top cross frame portion 23 which is formed by parallel spaced plates at the upper end of the uppermost section 24 of the tail end standard or frame 12. The upper frame section 24 is generally U-shaped and with the ends of the legs thereof pivotally connected by a cross rod 25 to the upper end of the lower frame section 13, whereby the upper frame section 24 is pivotally movable relative to the fixed frame section 13. The top cross frame portion 23 of the upper frame section 24 is also provided with a vertical post receiving bore or sleeve 26.

The way 19 is adapted to support thereon a head stock unit 27 on which the operating tool and its associated driving means is mounted. The head stock 27 (Figs. 4 to 9) comprises a carriage forming portion which includes two axially spaced collars or ring members 28 and 29 which are connected in fixed relation by bearing guide or key members 30 and 31, which key members 30 and 31 are arranged in oppositely disposed relation and are adapted to be received in guide slots or grooves 32 and 33 extending axially on oppositely disposed sides of the way 19. The collars 28 and 29 are rigidly secured to the keys 30 and 31 and with the latter seated in the axially extending guide grooves 32 and 33 can not rotate relative to the axis of the way 19. The headstock unit 27 includes a trunnion formation having relatively movable guide track and slide members 34 and 35, the track member 34 being attached to or integral with a tube section 36 which forms a base or carriage portion of the headstock and which is mounted on the way 19 between the collar members 28 and 29. The tubular carriage member 36 is provided at opposite ends with clamp formations 37 and 38 which are adapted to be adjusted to three positions, one clamping the carriage member 36 to the way 19, a neutral position which permits axial and rotary movement of the head stock unit 27 and an open position which permits only axial movement of the head stock unit 27 on the way 19. The clamp formation 37 is formed by providing an axially extending slot 39 in the end portion of the tubular carriage member 36 which is adjacent the collar member 28 and axially extending jaw formations 40 and 41 which are in parallel opposed relation on opposite sides of the slot 39. One jaw formation 40 is provided with a threaded bore 42 for receiving the threaded end of a clamping bolt or screw 43. The screw 43 is rotatably mounted in a bore 44 in the jaw formation 41 and held against axial movement therein by an outer abutment shoulder 45 formed by an outer end portion of enlarged cross section and an inner stop collar 46 secured in any conventional manner on the shank of the screw. An operating knob or handle member 47 provides for manual adjustment of the screw 43 to move the jaw formations 40 and 41 toward and from each other. The outer end of the clamp formation 37 is rabbetted on its outer edge to form a circumferential clamping shoulder or ring 48 while the adjacent collar member 28 is rabbetted on the inner edge of its inner face to provide on the outer edge a circumferential clamping abutment or ring 49 for cooperation with the clamping ring 48. By manually rotating the screw 43 to move the jaw formations 40 and 41 toward each other the end of the carriage member 36 may be clamped in fixed relation on the way 19. When the screw is rotated to expand the clamping ring formation 48 it will engage in fixed clamping relation with the cooperating ring formation 49 on the collar 28 and clamp the end of the carriage member 36 to the collar 28 for movement therewith axially along the way 19. In this position rotational movement of the carriage about the axis of the way 19 is prevented by engagement of the key members 30 and 31 in the axial grooves 32 and 33. The screw 43 may be rotated to a neutral position in which the carriage member 36 is free to rotate about the way 19 and also to be moved axially of the way 19. The clamp formation 38 is formed in the same manner at the other end of the carriage member 36 for clamping cooperation with the way 19 or the collar 29 and is provided with a manually operable clamping screw 50. The two screws 43 and 50 are, of course, adjusted or turned to the same positions to permit the desired positioning of the carriage member 36 relative to the supporting way 19.

The trunnion guide track 34 is in the form of a curved plate-like member of rectangular cross section with the one face attached to the side of the carriage member 36 by a connecting web portion 51. The trunnion slide member 35 is curved in the same manner as the track 34 and has a C or channel-shaped cross section forming a guideway 52 for receiving the upper and lower edge portions of the track 34. A toothed rack formation 53 is provided along the lower edge of the slide member 35 which is engaged by an adjusting pinion 54 which is mounted on a pin or shaft 55 which is journalled in a downwardly extending bearing formation 56 on the carriage member 36. The shaft 55 may have its inner end journalled in a bearing 57 in the track 34. An operating knob or handle member 58 is provided on the outer end of the shaft 55 for manually controlling the rotation of the pinion or gear 54. A suitable locking device may be provided on the shaft 55 for locking it in any desired position or the slide 35 may be provided with a set screw-type of locking element 59 (Fig. 5) for locking the slide 35 in any desired position on the guide track 34.

The trunnion slide 35 has a laterally extending web or bracket formation 60 (Fig. 4) on its outer face which is fixedly secured to or integral with a normally upright sleeve-like section or member 61 for supporting a vertical trunnion post 62 which is adapted to be positioned therein and to be movable relative to the member 61. The post support member 61 is provided at its lower end with a clamp formation 63 which cooperates with a ring or collar member 64 on the post 62 for clamping the post 62 against movement relative to the support member 61. The ring member or collar 64 is connected to the lower end of the post support member 61 for axial movement therewith by providing an inwardly opening peripheral recess 65 (Fig. 6) on the inner upper edge of the collar 64 which terminates in an inwardly projecting peripheral shoulder 66 and a cooperating outwardly opening peripheral recess 67 on the outer lower edge of the post support member 61 which terminates in an outwardly projecting peripheral shoulder 68 with the shoulders 66 and 68 being seated in the recesses 67 and 65, respectively. The clamp formation 63 is of the same type as the clamp formation 37, and includes an operating screw 70 by means of which the support member 61 can be selectively clamped to either the post 62 or the collar 64.

The collar 64 is secured against axial rotation relative to the post 62 by means of a key 71 which is fixed to the collar 64 and received in an axial guide groove 72 in the post 62. Movement of the collar 64 in an axial direction on the post 62 is controlled by a spindle elevating screw 73 which has the threaded end of its shank engaged in a threaded aperture 74 in a corner portion 75 of the collar 64 and the head end of its shaft rotatably mounted in an aperture 76 in a corner portion of the end plate 77, the latter being secured on the lower end of the post 62. The screw 73 is retained in rotatably mounted relation in the aperture 76 by a stop collar 78 and the knob or operating head 79 on the end of the screw.

The end plate 77 extends laterally of the axis of the post 62 and forms the base for a tool operating motor 80. The motor 80 is provided with a drive pulley 81 which is connected by a drive belt 82 with a pulley 83 adjustably mounted on the end of the spindle 84. Both pulleys 81 and 83 may be stepped, or single as shown.

The spindle 84 is mounted in a quill 85 (Fig. 5) which is in turn mounted in a quill body 86, the latter being rigidly secured on the upper end of the post 62. The spindle 84 is rotatably supported in the hollow tube-like quill 85 by end bearings 87 and 88. It is held against axial rotation therein by stop collar 89 and locking nut 90, the latter being threaded on the spindle 84 at the tool bearing end thereof.

The quill 85 is non-rotatably mounted in the hollow body or housing 86 and adapted to be moved axially therein by means of a pinion 91 which engages with a rack formation 92 on the lower face of the quill 85. The pinion 91 is secured to a pinion shaft 93 (Fig. 4) which is journalled in the lower part of the housing 86 and provided at opposite ends with suitable operating handles, levers or knobs 94. A stop collar 95 may be adjustably mounted on the splined end of the spindle 84 to limit the axial movement of the spindle if desired. The quill housing 86 may be provided with a handle 96 for convenience in adjusting or moving the same.

When the apparatus is set up for use as a lathe the end of the spindle 84 is provided with a suitable work engaging tool such as a face plate or chuck while the center 97 (Figs. 1 and 2) is secured in an aperture 98 in the top portion of the table extension 99 which is supported by the upright post 100 and functions as a tail stock. The table extension post 100 may be secured in the vertical bore 26 in the tail end frame member 24. Alternately, the post 100 may be secured in the vertical bore 101 in the work table support carriage 102 as shown in Fig. 1. A lathe tool rest 103 is provided which is pivotally mounted at 104 on an arm 105. The arm 105 has a depending pivot pin 106 adjustably secured in a vertical bore 107 in a carriage member 108. The pivot members 104 and 106 are locked in position by suitable locking screws 109 and 110. The carriage 108 is in the form of a split sleeve which encompasses the way 19. A clamp bolt 111 is adapted to lock the carriage to the way 19 when it is adjusted to the desired position.

When the apparatus is set up for use as a table saw (Figs. 4, 5 and 10) the saw blade 112 is, of course, mounted on the end of the spindle 84 and a work table 113 is adjustably supported on the way 19 by the work table carriage 102. The work table carriage 102 comprises spaced end rings or collars 114 and 115 which are rigidly connected by key members 116 and 117, the latter extending axially of the way 19 and normally received in sliding relation in the longitudinal guideway grooves 32 and 33 thereby permitting axial sliding movement of the carriage 102 on the way 19. The collar 115 (Figs. 1 and 2) is solid while collar 114 is split and provided with a clamping screw or bolt 118 having an operating handle 119 which permits the carriage to be locked against axial movement on the way 19. A table post support 120 (Fig. 4) is mounted on the way 19 between the collars 114 and 115. The table post support 120 has a tube forming section which is provided with a clamp formation 121 at one end which is formed in the same manner as clamp formation 37. The clamp formation 121 has a clamping bolt 123 which when tightened clamps the carriage member 120 in fixed relation to the way 19. When the clamping bolt 123 is loosened to a neutral position the carriage member 120 is free to slide longitudinally on the way 19 and to rotate about the same. The end of the member 120 is rabbetted to provide an inner shoulder 125 for cooperation with an outer shoulder 126 on the adjacent rabbetted edge of the collar member 115 so that the clamping bolt 123 may be moved to a third position in which it expands the shoulder 125 against the shoulder 126 and locks the carriage member 120 in rigid relation with the collar 115 so that it is free to slide along the way 19 with the collar 115 when the collar 114 at the other end of the carriage is unlocked.

Figure 5:
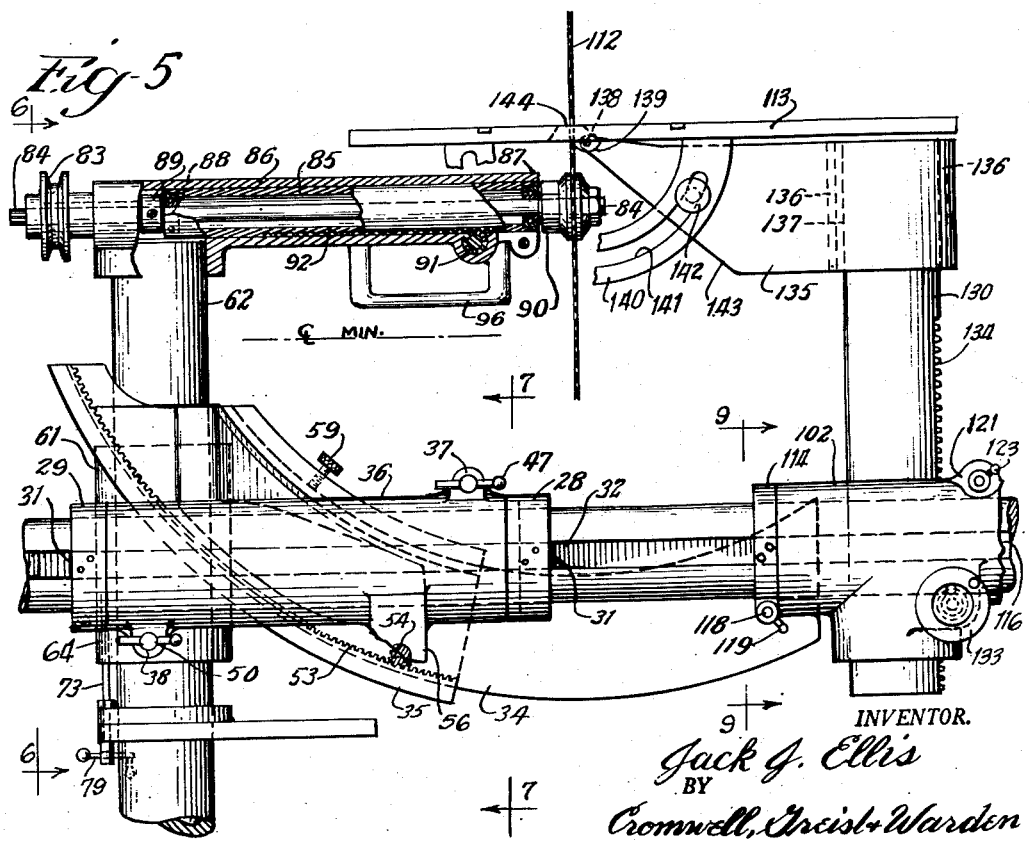
Fig. 5 is a side elevation, with portions broken away, of the apparatus shown in Fig. 4 with the table in position for use.

The table 113 is adjustably mounted on the table support 120 by means of the normally upright post 130 which is adapted to be received in the bore 101 and which is adjusted vertically as shown in Fig. 5 by means of a pinion 131 carried on an operating shaft 132. Shaft 132 is journalled in the support or carriage member 120 and has an operating handle member 133. The pinion 131 engages with a rack formation 134 on the post 130. The post 130 carries at its upper end a generally rectangular table support frame having spaced side plates 135 secured at one end to cross plates 136 between which are secured laterally spaced sleeves 137 providing bores for receiving the upper end of the post 130. The side plates are provided at their other ends with a cross rod 138 which forms a pivot for bearing brackets 139 secured to the bottom face of the work table 113. The table 113 is secured against rotation about the piovt 138 by an arcuate plate member 140 which depends from the bottom surface of the table member 113 and which is provided with the arcuate slot 141 having the same center as pivot rod 138 and receiving a clamp bolt 142 extending laterally from the side frame plate 135. The front ends of the side frame plates 135 are beveled or cut away at 143 to provide clearance for the saw blade 112 which is adapted to operate in the slot 144 in the table member 113. The table 113 is, of course, movable about the pivot rod through an arc of approximately 135 degrees. The table member 113 is provided with the usual cross grooves for accommodating a miter guide for cross cutting and also with the usual rip fence (not shown). By adjusting the trunnion moving pinion 54 in the head stock and the post elevating screw 73 the saw blade 112 can be tilted relative to the table 113 to make angle cuts as shown in Fig. 10.

The tool may be readily adapted for use as a disk sander as shown in Fig. 11 by merely substituting a sanding disk 146 for the saw blade 112 on the work spindle 84 and adjusting the table carriage 102 and table 113 to the desired position relative to the disk 146.

In adjusting the tool for use as a radial saw (Fig. 12) the head stock 27 is rotated 180 degrees about the way 19 to bring the spindle 84 between the way 19 and the table 15 which is supported on the longitudinal frame members 14, and the spindle is then rotated 90 degrees about the axis of the post 62. The saw blade 112 may be raised or lowered as required relative to the table 15 on which the work may be supported. The carriage 36 is clamped so that it is free to slide on the way and permit the blade 112 to be reciprocated for cutting material positioned on the table 15.

The tool is adjusted for use as a router as in Fig. 13 by rotating the head stock 27 about the way 19 to bring it beneath the same and then rotating the post 62 in the support 61 to position the spindle 84 in a plane extending transversely of the way 19 with the tool carrying end thereof upright and adjusting the position of the table 113 to receive the same in a suitable aperture provided therein (not shown).

When it is desired to convert the tool for use as a drill press (Figs. 14 and 15) the head end of the way 19 is released by withdrawal of the locking screw 20 and the tail end frame section 24 is swung outwardly about the pivot 25 to the position shown in dotted line in Fig. 2 with the way 19 extending vertically. The end frame section 24 is held or locked in this position by suitable lock or latch means such as a lock bolt or screw 150 (Fig. 15) mounted in a supporting bracket 151 on the top cross frame member 152 of the bottom tail end frame section 13 with the end of the screw adapted to be received in a cooperating lock aperture 153 in the frame side plate 154. The head stock 27 is positioned at the desired height from the floor and the head stock carriage 36 is locked on the supporting way 19. The tool support carriage 108 may also be secured to the way 19 at the bottom end of the carriage 36 to act as a stop collar and prevent any downward movement of the head stock carriage 36. The table 113 which is illustrated in Figs. 4 and 5 and its supporting frame structure may be employed as a work supporting table when the head stock 27 is in position for use as a drill, the table 113 being swung about its pivot 139 to position it in a horizontal plane below the tool carrying end of the spindle 84. A modified form of work table 155 may also be used as in Figs. 14 to 16. The modified work table 155 is mounted on the end of a supporting post 156 which is identical with the post 130 and which is adapted to be adjustably mounted on the supporting way 19 by the same carriage 102. The mounting frame for the table 155 comprises spaced side plates 157 connected at one end by spaced cross plates 158 between which two spaced sleeves 159 are mounted which provide bores for the upper end of the supporting post 156. At their other ends the side plates 157 are connected by a brace bar 160 which has its ends extended to form end supporting and locking pins 161 which are provided with locking nuts 162. Two spaced supporting pins 163 and 164 are located at right angles to the pin 161 for cooperation therewith to secure the table member 155 in position thereon. The table member 155 has a U-shaped bracket 165 secured on its lower face with the leg members having a pair of downwardly or outwardly opening slots 166 which are adapted to receive the support pins 161 and 163 when the table member 155 is in one position of adjustment on the frame and the pins 161 and 164 when it is in its other position of adjustment. In the position shown in Figs. 14 and 15 the table member 155 is supported on the end edges of the side frame members 157 and locked in position by the nuts 162 to provide a work supporting surface in a plane extending at right angles to the axis of the supporting way 19. In its other position as indicated in Fig. 16, the table member 155 is supported in locked position on the top edges of the side frame members with the working surface in a plane extending parallel to the axis of the way 19.

In illustrating and describing the various adjustments and uses of the tool it will be understood that only the principal adjustments and uses have been referred to. It will be obvious that the tool is capable of other adjustments to adapt it for use in performing a variety of operations on work pieces of many different kinds and shapes.

While specific materials and details of construction have been referred to in describing the illustrated embodiments of the invention it will be appreciated that other materials and other details of construction may be resorted to within the spirit of the invention.

I claim:

1. In a convertible tool, a cylindrical supporting way, a tool carrying head stock, and a carriage which is adapted to movably support the head stock on the way, said carriage comprising a sleeve-like member which is attached to the head stock and a pair of spaced end collars which are mounted on the way, said collars being connected by oppositely disposed key members which engage in axial slots in the way and hold the collars against rotation about the way while permitting movement of the same in the direction of the axis of the way, and clamp means associated with said sleeve-like member which is operable in one position to clamp said sleeve-like member against rotational or axial movement on the way and in another position to clamp said sleeve-like member to said collars to permit movement of the carriage in the direction of the axis of the way while holding the carriage against rotation about the way.

2. In a convertible tool, an elongate cylindrical bar forming a supporting way, a tool carrying head stock, and a carriage which is adapted to movably support the head stock on the way, said carriage comprising a central member which is attached to the head stock and a pair of associated end members, said central member and said end members having aligned bores for receiving the way, means connecting said end members together, a spline connecting each end member in non-rotating sliding relation with the way, and clamp means on said central member which is operable in one position to clamp said central member against rotational or axial movement on the way and in another position to clamp said central member to said end members to permit movement of the carriage in the direction of the axis of the way while holding the carriage against rotation about the way.

3. In a convertible tool, an elongate shaft forming a supporting way, a tool carrying head stock, and a carriage which is adapted to movably support the head stock on the way, said carriage comprising a tubular member which is attached to the head stock and a pair of tubular end members which are mounted on the way, said end members being connected in spaced relation by a key which engages in an axial slot in the way and holds the end members against rotation about the way while permitting movement of the same in the direction of the axis of the way, and said tubular head stock member having clamp means which is operable in one position to clamp said tubular head stock member against rotational or axial movement on the way and in another position to clamp said tubular head stock member to said end members to permit movement of the carriage in the direction of the axis of the way while holding the carriage against rotation about way.

4. In a convertible tool, a tubular supporting way, a tool carrying head stock, and a carriage which is adapted to movably support the head stock on the way, said carriage comprising a sleeve-like member which is attached to the head stock and collars at the end of the sleeve-like member which are slidably mounted on the way, said collars being connected by a key which engages in an axial slot in the way and holds the collars against rotation about the way while permitting slidable movement of the same on the way, and said sleeve-like member having clamp means which is operable in one position to clamp the same against rotational or axial movement on the way and in another position to clamp said sleeve-like member to said collars to permit movement of the carriage along the way while holding the carriage against rotation about the way.

5. In a convertible tool, an elongate cylindrical supporting way, a tool carrying head stock, and a head stock carriage which is movably mounted on the way, said carriage comprising a central member secured to the head stock, and provided with a bore for receiving the way, a pair of end members having aligned bores for receiving the way, said end members being connected by a spline member extending through said bores in non-rotating sliding relation with the way, said way having an axial groove for receiving said spline member, and clamp means associated with said central member and said end members, which clamp means is operable in one position to lock said central member against movement on the way and in another position to lock said central member to said end members to permit movement of the carriage in the direction of the axis of the way while holding the carriage against rotation about the way.

6. In a convertible tool, an elongate cylindrical bar forming a supporting way, a tool carrying head stock, and a carriage which is adapted to movably support the head stock on the way, said carriage comprising a central member which is attached to the head stock and a pair of associated end members, said central member and said end members have aligned bores for receiving the way, said end members being connected together, means connecting the end members in non-rotating sliding relation with the way, clamp means associated with said central member and said end members which is operable in one position to clamp said central member against rotational or axial movement on the way and in another position to clamp said central member to said end members to permit movement of the carriage in the direction of the axis of the way while holding the carriage against rotation about the way, and said head stock comprising a bracket extending laterally of said central carriage member and having a track, a guide member positioned in said track, a supporting sleeve on said guide member, a post slidably and rotatably mounted in said supporting sleeve, a motor mounted at one end of said post, a quill body mounted at the other end of said post, a quill mounted for reciprocation in said quill body and a tool carrying spindle rotatably mounted in said quill.

7. In a convertible tool, an elongate cylindrical bar forming a supporting way, a tool carrying head stock, and a carriage which is adapted to movably support the head stock on the way, said carriage comprising a sleeve forming member which is attached to the head stock and a pair of associated end collar forming members, said sleeve member and said collar members having aligned bores for receiving the way, said collar members being connected in fixed relation to each other, a spline connecting said collar members in non-rotating sliding relation on the way, clamp means on said sleeve member which is operable in one position to clamp said sleeve member against rotational or axial movement on the way and in another position to clamp said sleeve member to said collar members to permit movement of the carriage along the way while holding the carriage against rotation about the way, said sleeve forming member having a track formation of C-shaped cross section, a post supporting member having a slide formation positioned in said track formation, means for locking the slide formation in adjusted position in the track formation, a post slidably and rotatably mounted in said post supporting member, means for adjusting said post in said post supporting member and for locking the same in adjusted position, a support adjacent one end of said post for a drive motor, a quill support adjacent the other end of said post, a quill mounted in said quill support and a tool operating spindle rotatably mounted in said quill.

8. In a convertible tool having a supporting way, a carriage mounted on the way, said carriage comprising a central member having a bore for receiving the way and two end members each having a bore aligned with the bore in the central member, means connecting said end members for non-rotating sliding movement on the way, and clamp means at one end of the central member for selectively clamping the central member directly to the way or to the adjacent end member to thereby clamp the carriage against movement on the way or to clamp the carriage against rotational movement while permitting longitudinal movement thereof.

9. In a convertible tool, an elongate cylindrical bar forming a supporting way, a tool carrying head stock, and a carriage which is adapted to movably support the head stock on the way, said carriage comprising a central member which is attached to the head stock and a pair of associated end members, said central member and said end members having aligned bores for receiving the way, said end members being connected together and being mounted for non-rotating sliding movement in the way, and clamp means on said members which is operable in one position to clamp said central member against rotational or axial movement on the way and in another position to clamp said central member to said end members to permit movement of the carriage in the direction of the axis of the way while holding the carriage against rotation about the way, said head stock comprising a base member which is attached to the central member of said carriage and a spindle carrying member which is connected for pivotal movement relative to said base member and means for clamping said base member and said spindle carrying member against movement relative to each other.

10. In a convertible tool having a supporting way provided with parallel axial groves, a carriage mounted on the way, said carriage comprising a central sleeve-like member having a cylindrical recess for receiving the way, and two end collar members each having a recess for receiving the way which is aligned with the recess in the central member, slide bars connecting said end collar members and received in the grooves in said way for non-rotating sliding movement on said way, and clamp means on the central member for selectively clamping the central member directly to the way or to the adjacent end collar member to thereby clamp the carriage against movement on the way or to clamp the sleeve against rotational movement about the way while permitting longitudinal movement of the carraige.

References Cited in the file of this patent

UNITED STATES PATENTS

| | | |
|---|---|---|
| 1,510,167 | Wilhelm | Sept. 30, 1924 |
| 1,618,358 | Thompson | Feb. 22, 1927 |
| 2,013,778 | Halvorsen et al. | Sept. 10, 1935 |
| 2,050,347 | Lochman | Aug. 11, 1936 |
| 2,052,600 | Boss | Sept. 1, 1936 |
| 2,200,799 | Miller | May 14, 1940 |
| 2,517,608 | Taylor | Aug. 8, 1950 |
| 2,623,269 | Goldschmidt | Dec. 30, 1952 |

FOREIGN PATENTS

| | | |
|---|---|---|
| 403,773 | Germany | Oct. 9, 1924 |
| 689,368 | France | May 26, 1930 |
| 890,133 | France | Oct. 25, 1943 |
| 655,292 | Great Britain | July 18, 1951 |